3,565,796
METHOD FOR INCREASING OXYGEN AVAILABILITY IN SEWAGE TREATMENT

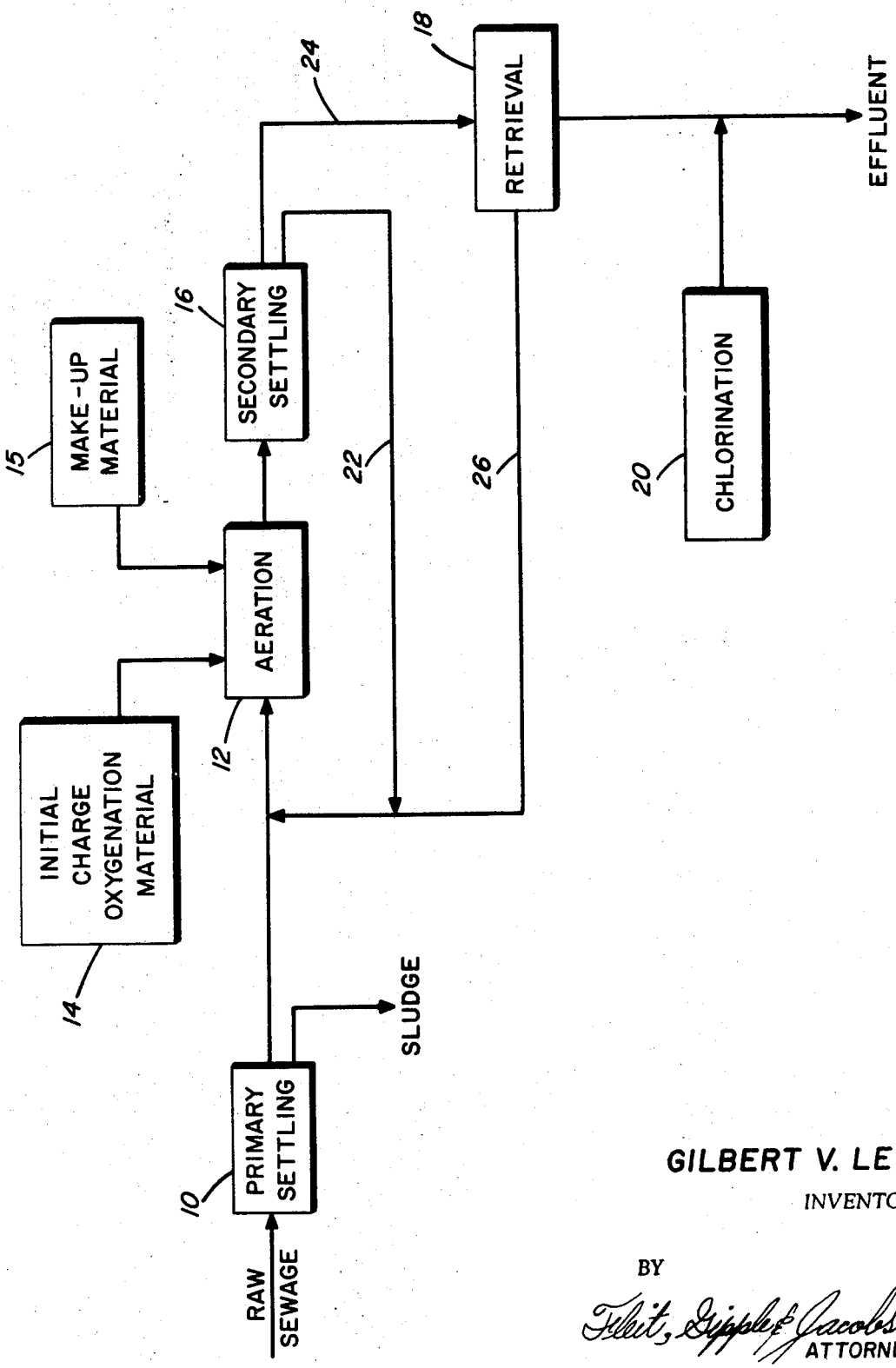

Gilbert V. Levin, Chevy Chase, Md., assignor to Biospherics Incorporated, Rockville, Md., a corporation of the District of Columbia
Filed Feb. 11, 1970, Ser. No. 10,337
Int. Cl. C02c 1/06
U.S. Cl. 210—3                          13 Claims

ABSTRACT OF THE DISCLOSURE

An aerobic sewage treatment process making available to the sewage treating microorganisms a large quantity of oxygen. The oxygen availability is increased by adding to the sewage, immiscible substances which can sustain relatively high concentrations of dissolved oxygen or miscible substances with high oxygen-carrying capabilities and which can be readily separated from water.

BACKGROUND OF THE INVENTION

There are many well known aerobic sewage treatment processes. One of the principal limiting factors in the efficiency obtained and the time required for these processes is the relative insolubility of oxygen in water. It has been found that only a small percent of the oxygen in the air which is fed into existing sewage treating plants is now being utilized. At normal sewage treating pressures and temperatures, the saturation level for dissolved oxygen is approximately 6 to 10 milligrams per liter. Even with the use of techniques currently available for inducing supersaturation of oxygen in water, the dissolved oxygen level can rarely be maintained above 10 to 14 milligrams per liter.

It has been found that the activity of the microorganisms responsible for the bio-degradation of sewage is dependent upon the supply of oxygen; and therefore the efficiency of known aerobic processes can be increased by increasing the supply of oxygen made available to these microorganisms. It is toward this goal that the present invention is directed.

SUMMARY OF THE INVENTION

This invention relates to an aerobic sewage treatment process which makes available to the microorganisms responsible for the bio-degradation of sewage an amount of oxygen substantially greater than that made available by means of prior art processes. More particularly, immiscible substances which can sustain relatively high concentrations of dissolved oxygen, or miscible substances having high oxygen-holding capabilities, are introduced into the sewage. These substances effect high oxygen transfer rates and are maintained, respectively, in a highly divided suspension or in a uniformly mixed solution by means of the conventional aeration system.

The oxygen-rich reservoir resulting from the performance of the method described above is available for rapid transfer to the microorganisms in the water phase or in the single, water miscible substance phase of the sewage treating process. The oxygen reservoir is recharged by the aeration process as rapidly as oxygen is removed through metabolic uptake by the microorganisms.

In view of the high level of oxygen availability in the aeration chamber, it is evident that the time required for oxygen exposure can be substantially reduced.

After adequate retention in an aeration basin, the sewage, or mixed liquor, flows through another portion of said basin or into a separate basin wherein the high oxygen capacity substance is separated from the sewage. In the case of immiscible substances, this is accomplished by simple settling. Miscible substances are separated by other means, e.g., chemical complexing, precipitation or physical processes. The recovered high-oxygen capacity substance is then returned to the aeration basin, the sewage separated therefrom being further processed by conventional methods or discharged from the system. A small amount of high-oxygen capacity substance is then introduced into the aeration basin to compensate for such losses as naturally occur in the process.

It is contemplated that the high-capacity oxygen solvent, whether miscible or immiscible, have the characteristics of being non-toxic and non-inhibitory to the functioning of the microorganisms. It is further contemplated that the substance be inert to bacterial attack and not constitute a pollution threat in the quantities which might escape into a discharge stream. Also, the substance should be of a low volatility and should be readily separable from hte sewage. Thus, a single charge of the material in the sewage treating plant, with the periodic addition of small make-up quantities, is sufficient for continued operation in an aerobic sewage treating process.

Accordingly, it is an object of the present invention to provide a highly efficient aerobic sewage treating process.

It is another object of the invention to increase the activity of the microorganisms responsible for the bio-degradation of sewage.

It is another object of the invention to increase the activity of sewage treating microorganisms by increasing the supply of oxygen available thereto.

It is still another object of the invention to provide a highly efficient sewage treating process wherein efficiency is kept high by means of a system which retains and circulates available oxygen.

It is yet a further object of the invention to provide a sewage treating process which greatly increases the capacity of existing sewage treating plants.

It is still another object of the invention to provide a sewage treating process which reduces treatment time, capital costs, and operating costs.

It is still a further object of the invention to provide a highly efficient sewage treating process resulting in a more acceptable effluent.

It is yet a further object of the invention to provide a sewage treating process in which odors are greatly reduced by maintaining sewage more highly aerobic and thereby reducing the aeration of sewage with its associated release of entrained odoriferous gases.

These and other objects of the invention, as well as many of the attendant advantages thereof, will become more readily apparent when reference is made to the following description taken in conjunction with the accompanying drawing, in which:

The sole figure shows a flow diagram of a sewage treating process in accordance with the teachings of the present invention.

DETAILED DESCRIPTION OF THE INVENTION

With reference to the sole figure, there is gven a flow diagram of the sewage treating process contemplated in the instant invention. Raw sewage is introduced into the primary settling chamber 10 wherein a detention period on the order of hours allows the sludge to settle. The overlying liquid portion of the sewage passes to an aeration chamber 12, said chamber being of the well known variety wherein the mixed liquor is subjected to continuous contact with oxygen-carrying bubbles produced therein.

Also introduced into the aeration chamber 12, by means of an oxygenation material reservoir 14, is a substance which is a high-capacity oxygen solvent. The oxygen solvent can be of the type which is either soluble in water or is immiscible but emulsifiable in water. If the former, the material should have a high oxygen-carrying capability and should be readily separable from water; and if the latter, the material should be capable of sustaining relatively high concentrations of dissolved oxygen.

For ease in understanding the invention, the remainder of the figure will first be explained with reference to the case wherein the oxygenation material is of the immiscible but emulsifiable variety, there then following a discussion of the case wherein the oxygenation material is soluble in water. The emulsion contained in the aeration chamber 12 receives several hours' detention as it progresses into a secondary settling chamber 16, similar in most respects to the primary settling chamber 10. In chamber 16, the emulsion is separated into its three constituent parts. These are (1) the clarified liquid, (2) the high-capacity oxygen solvent, and (3) the sludge. For purposes of description only, it will be assumed that the sewage sludge is the heaviest of the three constituents, the high-capacity oxygen solvent being the next heaviest, and the clarified liquid being the lighest. It will be evident to the skilled artisan, however, that for purposes of the invention, the relative weights of the three constituents can be other than as assumed above.

The present invention contemplates that the high-capacity oxygen solvent and the slurge be extracted from the secondary settling chamber 16 and be fed back ot the aeration chamber 12. This is accomplished as shown at 22. It is also contemplated that the clarified liquid, being lighter than both the high-capacity oxygen solvent and the sludge, be expelled from the system as an effluent. The effluent could, however, be made to undergo an optional chlorination process, this process being indicated diagrammatically at 20. While, under ideal conditions, the clarified liquid will be entirely free from the high-capacity oxygen solvent, such is not the situation in reality. Rather, it is assumed that a small amount or trace of the high-capacity oxygen solvent will be flushed out of the system as an effluent. Therefore, in order to maintain the oxygenation material at a useful level, provision is made for the addition of make-up material as needed. This step is indicated at 15.

In summary, in the case wherein the oxygenation material is insoluble in water, it is mixed, in an aeration chamber, with primary settled sewage and the sludge from secondary settled sewage, and is then passed on to a secondary settling chamber. After passing through the secondary settling chamber, the clarified liquid is expelled from the system as an effluent, with or without chlorination, and the high-capacity oxygen solvent, in combination with the sludge, is circulated back to the aerotion chamber 12. And, to replace any oxygenation material which might have escaped from the system, provision is made for the addition of make-up material.

Now, with continuing reference to the sole figure, the situation wherein the oxygenation material is soluble in water is described. As above, the raw sewage is fed to a primary settling chamber 10 where, during its transit, primary settling occurs. The sludge is removed and the clarified sewage passes to an aeration chamber 12. In the aeration chamber, the primary settled sewage is mixed with the oxygenation material originating in either the initial charge chamber 14 or the makeup chamber 15. After passing through the aeration chamber, the sewage flows into the secondary settling chamber 16 where the detention time is sufficient to allow the sludge to settle out of the solution. The sludge is returned to the aeration chamber 12 as shown by path 22. The solution of clarified liquid and oxygenation material is passed to a retrieval unit 18 via path 24. The retrieval unit serves to separate the oxygenation material from the clarified liquid and further serves to return the oxygenation material to the aeration chamber via path 26 and to pass the clarified liquid out of the system as an effluent. As in the case where the oxygenation material is immiscible in water, an optional chlorination step may be employed.

Contrasting, then, the situation wherein the oxygenation material is immiscible in water with the situation wherein the oxygenation material is soluble in water, the former does not require a retrieval unit for the separation of the oxygenation material from the clarified liquid. It should be noted, however, that even in the former case, the retrieval unit may be completely eliminated, the result being that a portion of the oxygenation material is wasted by being passed out of the system rather than recirculated therethrough.

As noted above, the oxygenation material is of the type which, when mixed with water, is capable of increasing the useful oxygen supply in a given volume of water. Therefore, by adding such material to the aeration chamber 12, the microorganisms housed in the aeration chamber have supplied thereto a large amount of oxygen. Accordingly, these microorganisms increase in activity and cause the biodegradation of the sewage at a rate far in excess of that associated with any process known in the prior art. Also, while the maximum level of BOD (biochemical oxygen demand) reduction attainable by means of the methods known to the prior art is of the order of 85%, the present invention offers a substantially higher level of BOD reduction.

In view of the above, it is evident that the sewage introduced into the aeration chamber 12 need remain in such chamber only a short time when compared with the time necessary in similar prior art aerobic sewage treating processes. This fact opens various opportunities to the designed of new sewage treating plants. First, the size of the plant could be made smaller without sacrificing the sewage-handling capacity of said plant. This is evident since the sewage need remain in the aeration chamber for only a fraction of the time necessary when employing prior art processes. On the other hand, the aeration chamber could be made the same size as those known to the prior art with the result being an increase in the sewage-handling capacity of a given plant. Further, presently existing plants could be easily altered in accordance with the teachings of the present invention and could thereby be made more efficient and productive.

Numerous materials exhibiting relatively high solvating power for oxygen can be employed. Preferably, such materials should be utilized which inhibit low toxicity to the organisms involved and which are easily separable from water. Among the immiscible materials which can be employed are numerous aliphatic and aromatic hydrocarbons such as mineral oil, paraffin oil, dodecyl benzene, dicyclo pentadiene, triisobutylene, propyl benzene cumene, butyl benzene, p-cymenes (p-isopropyl-toluene), $\beta$-pinene, Decalin, Ttetralin, n-decane, undecane isodurene, and docecane. Also suitable are higher boiling aliphatic alcohols such as, for example, those having at least 8 carbon atoms such as decyl alcohol, isoctanol, decyl alcohol blend, 1-tetra decanol, and tridecyl alcohol mixed isomer. Other suitable compounds include p-tert amyl phenol, $\alpha$-trichlorobenzyne, dioctyl phthalate, p-dichloro benzene, nitrobenzene, nonyl phenol, octyl decyl phthalate and triisobutyl amine. As stated above, water miscible materials can also be employed to carry out the present invention. These materials must be such that in admixture with water, the solubility for oxygen is higher than in water alone, and include, for example, glycerol, butanol and ethylene glycol.

While there have been disclosed numerous materials useful in practicing the instant invention, it should be remembered that there are many other materials which will become apparent to those skilled in the art capable of being substituted without departing from the spirit and scope of the invention. The invention contemplates the use of any high-capacity oxygen solvent which is nontoxic to the microorganisms and which can be readily separated from the sludge after is use. It is therefore the intent that the present not be limited to the specifics given above, but only by the appended claims.

I claim:
1. A method for increasing the supply of available oxygen to microroganisms for bio-degradation of sewage in an aerobic sewage treatment process which method comprises introducing sewage into an aeration zone, said aeration zone providing said sewage with continuous contact with oxygen-containing bubbles, admixing said sewage with a high capacity oxygen solvent in said aeration zone, said oxygen solvent being an organic liquid which is capable of rapidly transferring substantial amounts of oxygen from said oxygen-containing bubbles to microorganisms in said aeration zone thereby increasing the availability of oxygen to said microorgonisms, said oxygen solvent being relatively nontoxic to said microorganisms, passing an aerated admixture comprising a sludge portion, clarified liquid and said oxygen solvent from said aeration zone to a secondary settling zone, withdrawing said sludge portion from said secondary settling zone and recycling said sludge portion to said aeration zone, recycling a separate oxygen solvent portion to said aeration zone for admixture with said sewage, and passing clarified liquid to disposal.

2. The method of claim 1 wherein the sewage is introduced into a primary settling zone and a resulting clarified portion of said sewage is introduced into said aeration zone from said primary settling zone.

3. The method of claim 1, further comprising the steps of periodically adding a make-up quantity of oxygen solvent to compensate for amounts of material naturally lost in the process.

4. The method as recited in claim 1, wherein said oxygen solvent is soluble in water.

5. The method as set forth in claim 4, wherein said oxygen solvent is glycerol.

6. The method of claim 4 wherein said water soluble solvent is selected from the group consisting of glycerol, butanol and ethylene glycol.

7. The method of claim 4, wherein a solution comprising oxygen solvent and clarified liquid is withdrawn from said secondary settling zone and is passed to a retrieving zone for separation of said oxygen solvent from said clarified liquid portion of the sewage.

8. The method of claim 7 wherein said clarified liquid portion is withdrawn from said retrieving zone and subjected to chlorination prior to being passed to disposal.

9. The method as set forth in claim 1, wherein said oxygen solvent can sustain relatively high concentrations of oxygen and is immiscible in water.

10. The method as set forth in claim 9, wherein said oxygen solvient is mineral oil.

11. The method of claim 9 wherein said water immiscible ovygen solvent is selected from the group consisting of mineral oil, paraffin oil, dodecyl benzene, dicyclo pentadiene, triisobutylene, propyl benzene, cumene, butyl benzene, p-cymenes, (p-isopropyl-toluene), β-pinene, decalin, tetralin, n-decane, undecane, isodurene, dodecane, decyl alcohol, isoctanol, decyl alcohol blend, 1-terta decanol, tridecyl alcohol mixed isomer, p-tert amyl phenol, α-trichlorobenzyne, dioctyl phthalate, p-dichlorobenzene, nitrobenzene, nonyl phenol, octyl decyl phthalate and triisobutyl amine.

12. The method of claim 9 wherein said separate oxygens solvent portion is withdrawn from said secondary settling zone and recycled to said aeration zone.

13. The method of claim 12 wherein clarified liquid is withdrawn from said secondary settling zone and subjected to chlorination prior to disposal.

References Cited
UNITED STATES PATENTS

| | | | |
|---|---|---|---|
| 2,089,162 | 8/1937 | Goudey et al. | 210—3 |
| 3,220,945 | 11/1965 | Torpey | 210—5 |
| 3,291,729 | 12/1966 | Martin | 210—18X |
| 3,412,017 | 11/1968 | Abson et al. | 210—7 |

MICHAEL ROGERS, Primary Examiner

U.S. Cl. X.R.

210—11, 15, 18